United States Patent [19]
Hohn et al.

[11] 3,778,182
[45] Dec. 11, 1973

[54] TURBOMACHINE STRUCTURE

[75] Inventors: Alfred Hohn; Peter Novacek, both of Kirchdorf, Switzerland

[73] Assignee: Aktiengesellschaft Brown, Boveri & Cie, Baden, Switzerland

[22] Filed: Feb. 8, 1972

[21] Appl. No.: 224,573

[30] Foreign Application Priority Data
Feb. 19, 1971 Switzerland............................ 2438/71

[52] U.S. Cl..................... 415/101, 415/113, 308/9, 415/176
[51] Int. Cl.......................... F01d 3/02, F01d 11/10
[58] Field of Search.................... 415/100, 101, 103, 415/136, 137, 138, 219 R, 108, 113, 176; 416/116; 308/9; 74/574

[56] References Cited
UNITED STATES PATENTS
| | | | |
|---|---|---|---|
| 1,529,925 | 3/1925 | Say | 415/100 |
| 3,105,631 | 10/1963 | Hanny | 308/9 |
| 3,351,394 | 11/1967 | Hooker | 308/9 |
| 3,497,164 | 2/1970 | Horak | 74/574 |
| 3,521,981 | 7/1970 | Krzyszczuk | 308/9 |
| 3,544,233 | 12/1970 | Brown et al. | 415/219 R |

*Primary Examiner*—Henry F. Raduazo
*Attorney*—Ralph E. Parker et al.

[57] ABSTRACT

A turbomachine enclosed within a casing and provided with pedestal type plain bearings located outside the casing at opposite ends of the latter for supporting the rotor shaft. In addition to the externally located pedestal bearings, a flexible, centering, auxiliary bearing is mounted on the guide blade carrier within the casing to provide additional support for the rotor, this auxiliary bearing being located at the point of maximum amplitude of the fundamental oscillation frequency of the rotor so as to reduce shaft vibration disturbances.

4 Claims, 3 Drawing Figures

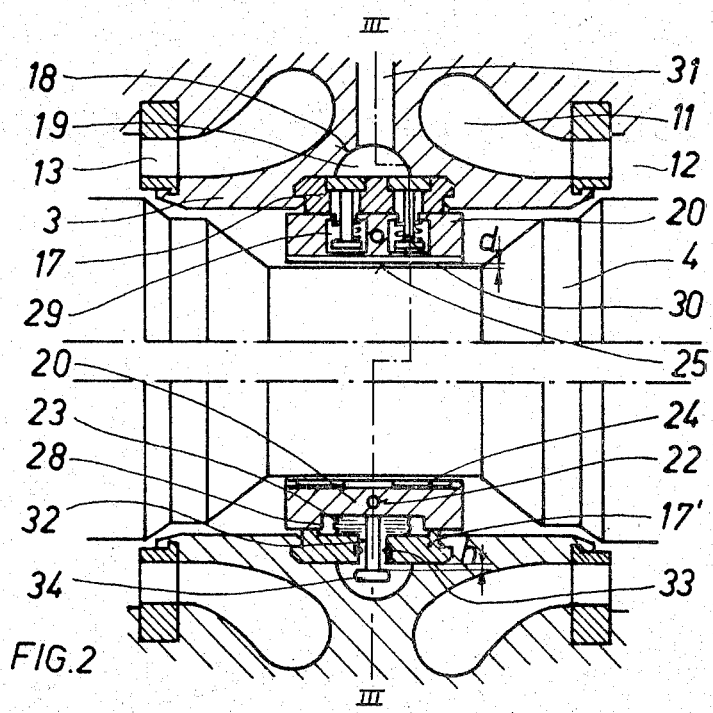
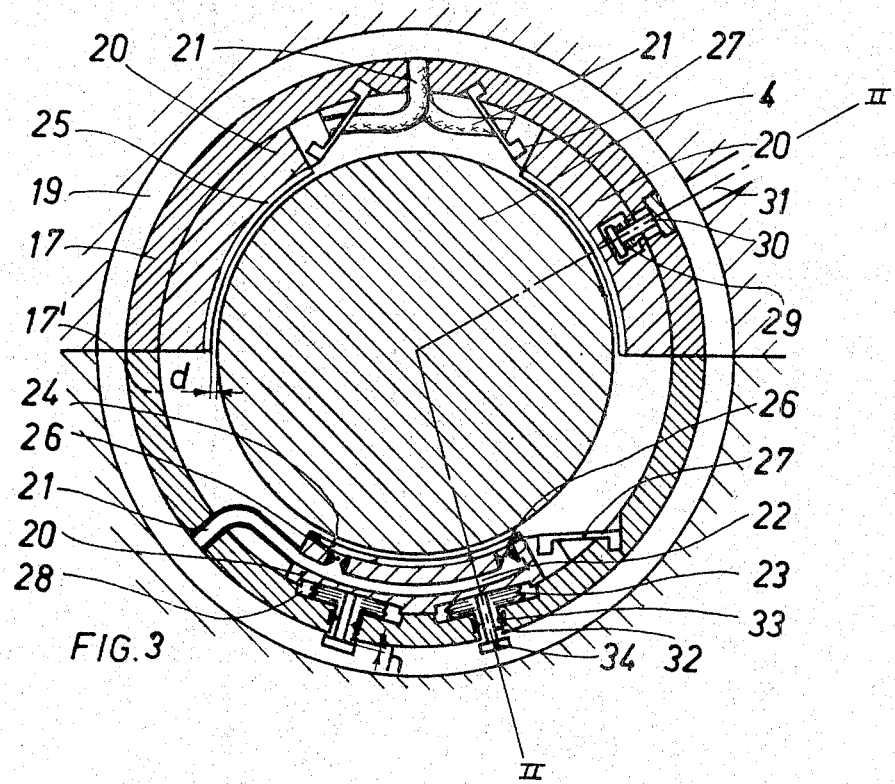
FIG.2
FIG.3

TURBOMACHINE STRUCTURE

The present invention relates to an improved technique for operating a turbomachine having a casing closed on all sides, its rotor being supported on bearings outside the blade assembly and its casing being provided with at least one thermally flexible supply duct for the working medium.

Turbomachines are known of which the turbine shafts, weighting several tons, are supported in plain bearings located outside and separate from the outer casing of the turbomachine. With this arrangement, however, the lowest natural frequency, or fundamental frequency, of the rotor is determined by the length of the casing or the distance between the bearings. If the supported length is great, this frequency is relatively low.

Vibration of the turbomachine shaft caused, for example, by flow separation or break in the flow duct and also by the slightest unbalance, is very difficult to reduce or eliminate.

Attempts have been made to counteract the resulting disturbances, which are perceptible as noise and vibration damage, by fitting damping devices, but these attempts have failed because the accessible parts of the shaft are at, or close to, a vibration node of the oscillating system, the position of the node being determined by the bearings.

The reason why these devices are not effective lies in the fact that the oscillation amplitudes applied to them are only relatively small or even non-existent, i.e., movements at the bearing points are of low energy. The leargest, high-energy amplitudes of the oscillating system, however, are produced inside the turbomachine and are therefore not accessible to vibration-damping devices because they normally occur within the bladed part of the rotor.

The purpose of the present invention is to avoid the disadvantages stated above and to improve the behaviour of turbo-machine rotors under conditions of oscillation.

This purpose is achieved according to the invention in that the natural frequency of the rotor is altered by providing an auxiliary bearing inside the casing.

A particular form of the improved technique for operating a turbomachine is distinguished by the fact that a flexible, centering, auxiliary bearing is located at the point of maximum amplitude of the fundamental oscillation of the rotor.

In another variant, the auxiliary bearing is supplied with a lubricant which is miscible with the working medium.

A turbomachine to effect the technique of the invention is constructed in such a way that inside the casing, and supported by it, there is an auxiliary bearing formed by bearing segments which are separate from each other and which are adjustable in the radial direction by means of membranes and guides, and the bearing segments are provided with means of lubricant supply.

A particular form is characterized by the fact that the bearing surfaces of the bearing segments are provided with recesses for the lubricant.

A further version is distinguished by the fact that in the tangential direction the bearing segments are rigidly fixed to a support ring by anchor plates, but can move in the radial direction through the agency of springs and guide pins, membranes, travel-limiting devices and chokes.

The advantages of the invention lie in the fact that the stability of turbine shafts is greatly improved with respect to steam whirl in the blade duct because raising the fundamental frequency has the effect of increasing the maximum capacity of the machine.

Steam whirl is caused by asymmetrical tip leakage in the blade duct, and maximum capacity is considered as that capacity of the machine beyond which a level of vibration occurs which endangers the entire turbomachine installation.

An example of a turbomachine in accordance with the invention is shown in the accompanying drawings wherein:

FIG. 2 is a longitudinal cross-section through the auxiliary bearing, taken on line II — II of FIG. 3 and shown on a larger scale; and FIG. 3 is a transverse cross-section through the auxiliary bearing at taken on line III — III of FIG. 2 of FIG. 2.

Figure 1:
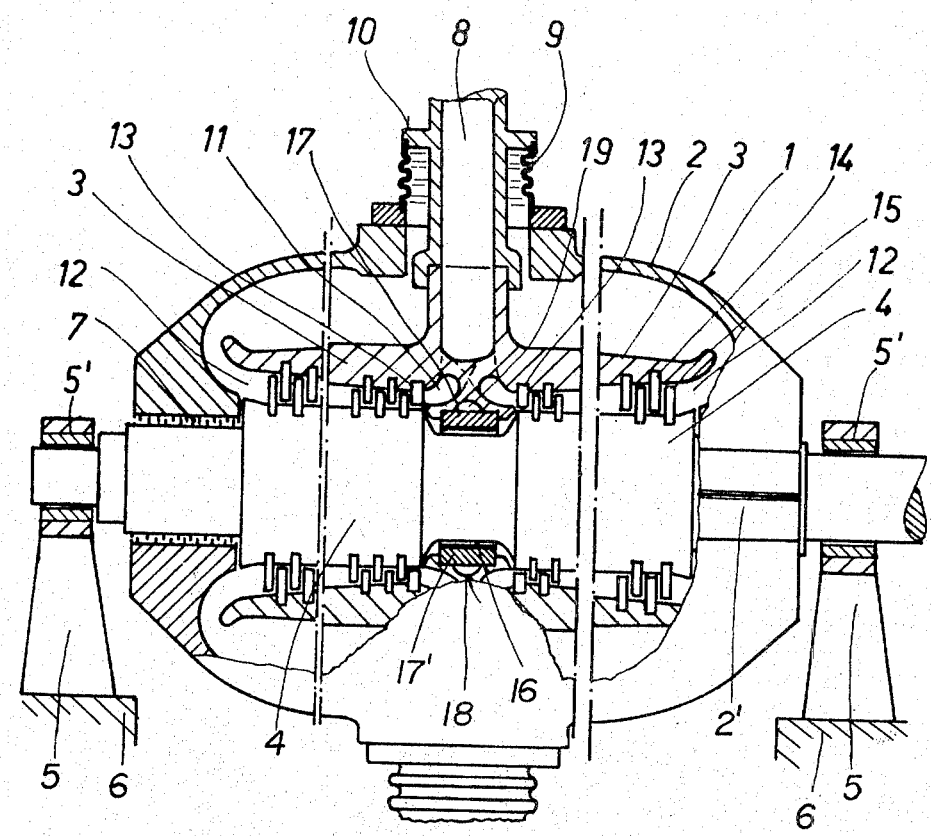
FIG. 1 is a longitudinal cross-section through a turbomachine.

FIG. 1 shows the casing 1 of the turbomachine, a steam turbine, the main parts of the casing being the outer casing 2 and the inner casing 3, which is in the form of a guide blade carrier. The rotor 4 is supported by means of bearing pedestals 5 on plain bearings 5' which rest on the foundation 6 with no direct connection to casing 1.

The rotor 4 passes through casing 1 at glands 7 located in outer casing 2. Casing 2 in the example is split along an axial plane and provided with flanges 2' for connection of the two halves of the casing.

The supply pipe 8 for the steam is situated in the middle portion of casing 1. This pipe is connected to both outer casing 2 and inner casing 3 by way of a thermally flexible lead-through 10 fitted with a bellows 9.

The steam pipes 8 terminate in annular ducts 11, from where the steam flows via nozzle rings 13 in opposite directions along the rotor to blade ducts 12 and gives up its energy through multiple-stage expansion between fixed guide blades 14 and moving blades 15.

Between the annular ducts 11 is a hydrostatic auxiliary bearing 16 supporting rotor 4 at the point where, with two-bearing support, the maximum amplitude of the fundamental oscillation of the turbomachine shaft would occur. This bearing has the effect of raising the natural frequency of rotor 4, and so creates conditions for improving the smooth-running characteristics of the machine.

In addition to the steam supply pipes 8 in the middle of casing 1 there is also a lubricant pipe which feeds lubricant to auxiliary bearing 16.

There is an advantage in selecting the lubricant such that it can mix with the working medium of the turbomachine without affecting operation. With a steam turbine, for example, the lubricant for the bearing would preferably be water or condensate, in which case the overall state of the lubricant can be altered during the lubrication process. In the same way, gases or vapours can be used as lubricants.

The longitudinal cross-section of FIG. 2 shows the construction of the auxiliary bearing 16 according to the invention. Corresponding parts in FIG. 2 and 3 have the same reference numbers as in FIG. 1. The inner casing 3 contains a split support ring 17 and 17'.

The outer side of this ring together with recess 18 in inner casing 3 forms an annular space 19. Support ring 17 is in two parts corresponding to turbine casing 1, and carries the bearing segments 20 of auxiliary bearing 16. Auxiliary bearing 16 is preferably fitted with three bearing segments 20, these being supplied with lubricant from annular space 19 via pipes 21 and ports 22. Lubricant is fed from the outside to annular space 19 by way of supply duct 31.

The individual bearing segments 20 are attached to ring 17 by flexible devices such as membranes 23 and springs 29 with guide pins 30, and in the manner of a hydrostatic bearing the bearing surface 25 of which is provided with recesses 24 which allow a lubricant film to form between the auxiliary bearing journal of rotor 4 and bearing segments 20. Between ports 22 and recesses 24 are choke orifices 26, shown in FIG. 3.

FIG. 3 shows the same example as FIG. 2. The transverse cross-section gives a better indication of the arrangement of the three bearing segments 20. The individual bearing segments are attached to support ring 17 and 17' by flexible anchor plates 27 and spring assemblies 29 with guide pins 30. Lubricant is supplied from annular space 19 to bearing segments 20 by flexible pipes 21 and fed to bearing surface 25 by way of ports 22 and choke orifices 26.

The bearing segments 20 are fitted with membranes or bellows 23 to which travel-limiting devices 34 are attached which project through aperture 32 into annular space 19. The membranes 23 are contained in membrane space 28 and so support bearing segments 20 flexibly on support ring 17 and 17'. Aperture 32 in support ring 17 or 17' contains a choke orifice 33 which regulates the flow of lubricant.

Operation of the auxiliary bearing 16 is described below, mainly with reference to the example shown in FIGS. 2 and 3.

The lubricant supplied to auxiliary bearing 16 has to perform a number of functions. Firstly, the lubricant flows through pipes 21, port 22 and orifice 26 into recesses 24 to form a lubricating film between the bearing surfaces 25 of and the bearing segments 20 and the surface of the rotor 4. Secondly, when the turbomachine is stationary, and the lubricant is therefore not under pressure, a clearance $d$ is provided between bearing surfaces 25 of bearing segments 20 and rotor 4. As a result, rotor 4 can be turned in bearings 5' located outside casing 1 without the need to supply lubricant to auxiliary bearing 16. When the lubricant feed rate increases and the lubricant pressure rises, lubricant flows by way of annular space 19 and orifice 33 into membrane 28 and exerts a radial pressure on bearing segment 20 so that the segment is pressed against rotor 4. Clearance $d$ then decreases in size until equilibrium is attained between the membrane force and the opposing force applied by the hydrostatic pressure of the lubricating film. When the lubricant pressure, and hence also the membrane force, is reduced, springs 29 return bearing segment 20 to the original position.

If for some reason the supply of lubricant to a bearing surface of the bearing segments should fail while the membrane force is still being applied, dry friction could occur between bearing segment 20 and rotor 4. Possible causes might be rupture of pipe 21 or blockage of orifice 26. The surface lining of bearing segment 20 should preferably be matched to the material of rotor 4 such that the lining wears away without damaging the rotor 4. The stop devices 34 also limit the travel $h$ of the bearing segments 20 so that the base material of the segments cannot come in contact with that of rotor 4. The travel $h$ of stop 34 is smaller than the sum of clearance $d$ and the thickness of the surface lining on bearing segments 20.

Bearing segment 20 is kept in position by the radial force applied by springs 29 and by the tangentially acting anchor plate 27, the ends of which are attached to ring 17, 17' and bearing segment 20, respectively. The anchor plate 27 is flexible, allowing bearing segment 20 to move relative to rotor 4 as a result of the membrane force, without exerting significant force, and yet preventing lateral movement and twisting of bearing segment 20.

The pipes 21 are made flexible so as not to impede radial movement of bearing segments 20.

If some force, e.g., unbalance, causes rotor 4 to oscillate, the movement is transmitted via the hydrostatic auxiliary bearing 16 to the individual bearing segments 20, which thus tend to reduce or enlarge the membrane space 28. Lubricant is thus pressed, or drawn, through orifice 33 and a damping action is applied to the oscillation of rotor 4. This damping action is therefore dependent on the compressibility of the lubricant, the size of membrane space 28, the speed of movement of the rotor 4 and the size of orifice 33.

In particular, auxiliary bearing 16 raises the critical speed of rotor 4 or of a shaft. The dynamic supporting effect of auxiliary bearing 16 forces the rotor 4 to adopt a different form of oscillation which corresponds to a higher natural frequency. If the rotor 4 executes a slow, radial movement due, for example, to a slight lift in bearings 5' outside casing 1 as a result of a change in the oil film, the lubricant has sufficient time to leave membrane space 28, or in the opposite case to flow into the space, whereupon the pressure in the space does not appreciably alter. The slight resultant force which bearing segments 20 together exert on rotor 4 arises solely from elastic deformation of springs 29, anchor plate 27 and pipes 21.

It follows from this that the auxiliary bearing 16 exerts no significant static force on the rotor 4, but has a strong stiffening action with respect to rotor oscillation because, in the event of rapid radial movement of rotor 4, by matching membrane 23, membrane space 28 and orifice 33 to each other the forces resulting from the movement are opposed by a corresponding damping resistance.

We claim:

1. A turbo-machine of the opposite flow type comprising a casing enclosed on all sides, a stationary opposite flow guide blade carrier located within said casing, a bladed opposite flow rotor located within said guide blade carrier, at least one thermally flexible duct passing into said casing at the central portion of said turbomachine for introducing a gaseous working medium for axial flow in opposite directions through the opposite halves of said guide and rotor blading, bearing means located outside of said casing at the opposite ends thereof for supporting the corresponding portions of the rotor shaft, a hydrostatic auxiliary bearing located centrally within said carrier, said auxiliary bearing being constituted by at least three flexibly supported bearing segments located in spaced relation around the periphery of the rotor shaft between the two halves of said guide and rotor blading, said bearing segments each having means resiliently connecting a portion thereof to said carrier, hydrostatic means communicating with said pressurized working medium for moving said bearing segments radially into yieldable engagement with and supporting said rotor shaft thereby reducing shaft vibration and lubricating said segments and spring means for retracting said bearing segments away from said shaft at a predetermined reduction in the pressure of said working pressure medium.

2. A turbo-machine as defined in claim 1 wherein the bearing segments of said auxiliary hydrostatic bearing are secured to a support ring surrounding said rotor by flexible anchor plates, and said bearing segments are rendered yieldable in a radial direction by means including membranes, spring-loaded guide pins, travel limit devices and bearing segment lubricant orifices.

3. A turbo-machine as defined in claim 1 wherein said bearing segments of said auxiliary hydrostatic bearing are carried by a ring surrounding said rotor and which is secured to said guide blade carrier, there being a circumferentially extending space provided between said guide blade carrier and ring for introducing the working medium for lubricating said bearing segments.

4. A turbo-machine as defined in claim 1 wherein said machine is a steam turbine and the lubricant for said auxiliary hydrostatic bearing is steam.

* * * * *